Figure 1:
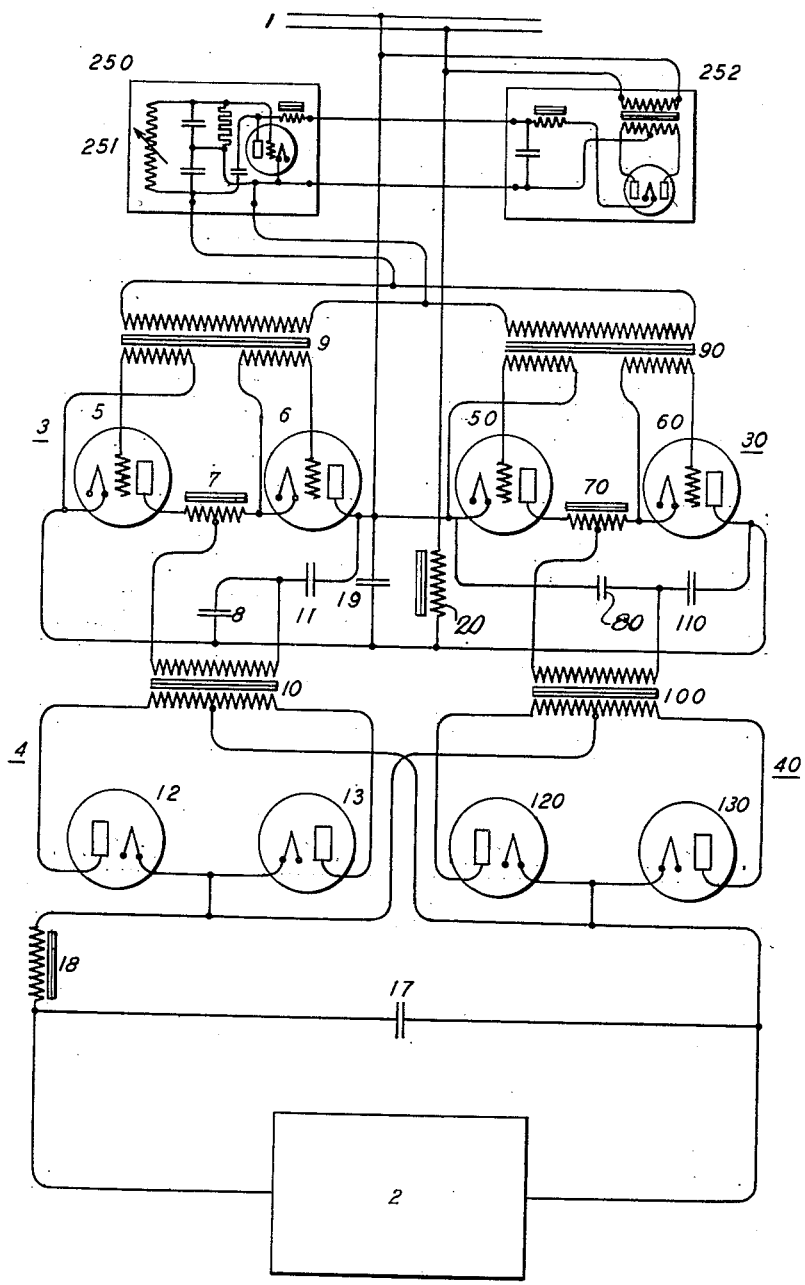

Sept. 11, 1934.  A. S. FITZ GERALD  1,973,055
ALTERNATING CURRENT POWER TRANSLATING OR CONTROL CIRCUITS
Original Filed Dec. 17, 1931    2 Sheets-Sheet 1

INVENTOR.
Alan S. Fitz Gerald (a) Input at frequency "F"

(g) Output of (30)

(b) Input to (3)

(h) Current in (12) and (13)

(c) Input to (30)

(i) Current in (120) and (130)

(d) Current in (5) and (6)

(j) Output of (4)

(e) Current in (50) and (60)

(k) Output of (40)

(f) Output of (3)

(l) Output to load (2)

Patented Sept. 11, 1934

1,973,055

UNITED STATES PATENT OFFICE 1,973,055

ALTERNATING CURRENT POWER TRANSLATING OR CONTROL CIRCUITS

Alan S. Fitz Gerald, Wynnewood, Pa.

Continuation of application Serial No. 581,614, December 17, 1931. This application May 25, 1933, Serial No. 672,838. In Great Britain, France, and Germany December 17, 1932

18 Claims. (Cl. 172—281)

My invention relates to alternating current power translating or control circuits and, more particularly, to circuits of the type wherein vapor electric devices are utilized, such as, for example, arrangements of the general type I have described in my co-pending application filed December 17, 1931, in the United States Patent Office, bearing Serial Number 581,614, now Patent No. 1,929,060, dated October 3, 1933.

Arrangements of this type, energized from an alternating current source, may be connected so as to furnish either direct or alternating current output. The present invention refers more particularly, although it is not limited, to the latter method.

Where the phase shift method of control is used, the wave shape of the anode current is seriously distorted, the resulting wave form presenting the appearance of a sine wave with a greater or lesser initial portion of the sine wave deleted giving the wave a "chopped" effect. The harmonic content of the resulting wave shape may in many cases largely exceed the power frequency component.

In consequence, this method of control has heretofore been largely restricted to heating, illuminating and other applications where the wave form is not of primary importance.

The use of vapor electric devices controlled on the phase shift principle for general power control applications has only been found permissible when used in conjunction with sufficient filtering equipment to furnish a resulting output of good wave shape.

The values of capacitance and reactance required for the various condensers and reactors of a filter circuit are usually of the same order of magnitude as might be associated with resonant circuits of the frequency of the power circuit. The cost of the necessary condensers and reactors, and the losses therein, for a 60-cycle power circuit, present a serious obstacle to the use of grid phase shift methods in alternating current power control systems.

The filter problem has, hitherto, prevented the practical use of alternating current vapor electric control systems operating on the grid voltage phase shift principle at 60-cycle frequency. The difficulties which would attend the use of such methods at frequencies of 50, 40, 25 or 16⅔ cycles are manifestly of correspondingly increased seriousness and have heretofore appeared to be insuperable.

The present invention has for its object to provide an improved vapor electric power control system, wherein the output derived from an alternating current power source is capable of being controlled in amplitude through the use of vapor electric or space discharge devices provided with control grids or electrodes, and wherein the wave shape of the output power is substantially coincident with that of the alternating current power source energizing the system.

It is another object of the invention to provide a vapor electric power control system having an alternating current output of good wave shape, in which no power frequency filter equipment is embodied and including no reactors or condensers rated to carry the controlled power, or an appreciable proportion thereof, at the power frequency.

It is a further object of my invention to provide a vapor electric power control system in which, although the control effect is exerted through grid control, requiring correspondingly small power therefor, more stable and accurate controlling action is obtained than has hitherto been possible where phase shift methods of control have been employed.

It is well-known that difficulties associated with temperature, gas pressure, and variations in the control characteristics of the vapor electric devices are encountered in control systems in which the grid control action of these devices is employed in such a manner as to limit flow of the anode current to a portion only of the alternating current cycle. My present invention provides an especially precise and reliable controlling action by virtue of the fact that the duration of the conducting period of the vapor electric devices is determined and controlled entirely by the constants of the associated circuit and is unaffected by variations in the control characteristics of the grids.

Instead of attempting to control the power, at the power frequency, by means of the grid voltage phase shift method, which as hereinbefore explained, involves wave form distortion which it is impossible economically to filter, the alternating current power is first converted by means of inverters comprising vapor electric devices, or other suitable means, into power at a substantially higher frequency.

The novel features of the invention are believed to reside in the fact that the power control is carried out, not at the power frequency, but at the higher frequency. Any distortion of wave shape resulting therefrom is a distortion of the higher frequency wave shape. It is well-known that the cost of filtering equipment varies inversely as the frequency. Thus, the distortion occurring in the high frequency circuit may readily be eliminated by filtering means of negligible cost and bulk in comparison with the equipment which would be necessary in order to filter an equal amount of deformation of wave shape at the lower frequency.

The high frequency power delivered by the inverters is supplied to rectifying equipment whereby the power is converted back to the original lower or power frequency. The output of the rectifying equipment, at the power frequency, may be controlled in magnitude by any suitable means capable of controlling the amplitude of the high frequency power.

For example, a control effect may be incorporated in the rectifying equipment as described in my co-pending application filed December 17, 1931, bearing Serial Number 581,614. Alternatively, the output of the inverters may be varied in a number of different ways, so that the amplitude of the high frequency power is subjected to a controlling effect before it is delivered to the rectifying equipment. The present invention is an example of the latter method of control.

The novel features which I believe to be characteristic of my invention will be set forth, with particularity, in the appended claims. My invention itself, however, both as to its organization and method of operation, together with further objects and advantages thereof, may best be understood by reference to the following description taken in connection with the accompanying drawings, in which Figure 1 is a diagrammatic view of a power control system including a preferred embodiment of my invention, and Fig. 2 is a view exemplifying the wave shapes assumed by currents in various portions of the system illustrated in Fig. 1.

Figure 2:
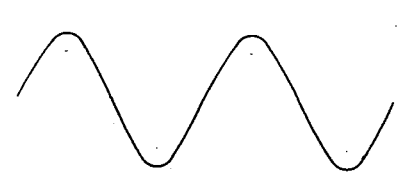
Figure 2:
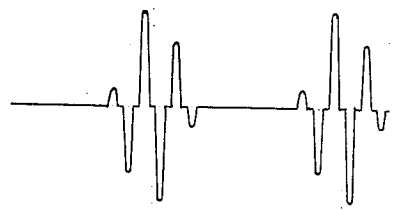
Figure 2:
Figure 2:
Figure 2:
Figure 2:
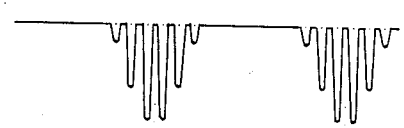
Figure 2:
Figure 2:
Figure 2:
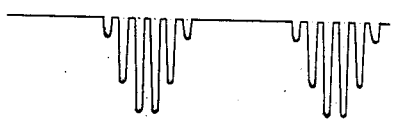
Figure 2:
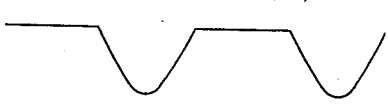
Figure 2:
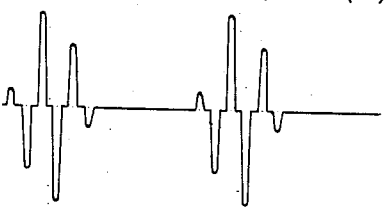
Figure 2:
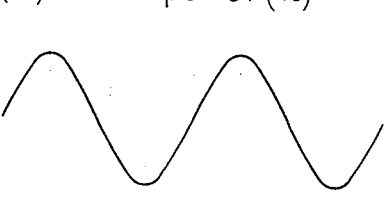

Referring to Fig. 1 a source of alternating current power 1 is arranged to supply current to a motor, transformer or other load device 2 through a power control circuit organized according to my invention, which circuit includes two electric power inverters or frequency changers 3 and 30 and two full-wave rectifiers 4 and 40.

The alternating current input from 1 is first converted by means of the inverters 3, 30 into electrical power at the higher frequency having an amplitude, the envelope of which corresponds to the frequency of 1. With this high frequency power the full-wave rectifiers 4, 40, which may be of the vapor electric, space discharge, contact, or other suitable type, are energized.

The output of the rectifiers, therefore, will have an envelope likewise corresponding with the wave shape of the power source 1. After filtering out the high frequency component the output of each rectifier will consist of half cycles of alternating current power of regular wave shape and frequency in accordance with the power source 1. These half cycles of power of the source frequency may be combined so as to furnish either alternating or unidirectional power in accordance with the method of connection of the rectifiers. As shown in Fig. 1 the rectifiers 4, 40 are connected to furnish alternating current power to the load 2.

The two electric power inverters 3, 30, energized by the source 1, may be of any suitable type and may include vapor electric devices or such other means as may be adaptable to the required purpose. By way of example, I show in Fig. 1 a vapor electric inverter circuit of the type disclosed in my Patent No. 1,752,247, but I wish it to be clearly understood that any other suitable frequency changing device may be used in this manner in accordance with the spirit of my invention.

Inverters 3, 30, include a plurality of vapor electric devices 5, 6 and 50, 60, each having anode, cathode and control electrodes, mid-tapped reactors 7, 70, condensers 8, 80, grid transformers 9, 90 and primary windings of output transformers 10, 100. The transformation ratio may be given any desired value, according to the voltage of supply and the requirements of the load. The operation of the inverters 3, 30 is substantially as explained in Patent No. 1,752,247.

In addition, I provide condensers 11, 110 connected between the anodes of 6, 60 and the junction between 8, 80 and 10, 100. The operation of the inverters is substantially the same when these condensers 11, 110 are present, with the additional advantage that the current drawn from the source from which an inverter of this type is operated is less discontinuous due to the presence of the condensers.

An inverter, as such, is a device for converting direct current into alternating current. An inverter of the type shown in Fig. 1 will generate alternating current continuously when connected to a direct current source, the anode of the device 6 being connected to the positive terminal of the said source. The amplitude of the alternating current output of the inverter, other circuit constants remaining unchanged, will be in direct proportion to the magnitude of the said direct current source. If, on the other hand, the inverter be connected to the direct current source with the anode of 6 connected to the negative terminal, the inverter, due to the unilateral conducting characteristic of the vapor electric device 6, will be entirely inoperative, neither generating alternating current output nor drawing direct current from the source.

If, now, such an inverter, arranged to operate at a frequency "$f$", be connected to an alternating current source of a frequency "$F$" substantially less then the operating frequency of the inverter, it will operate intermittently. During the half cycles when the anode is negative, the inverter will be inoperative. But, during the positive half cycles, the inverter will draw current from the alternating current source and will deliver an alternating current output of the inverter frequency. It has been pointed out above that in the case of an inverter operating from a direct current source, the amplitude of the alternating current output will be proportional to the voltage of the direct current source. Thus, in the case of an inverter operating from an alternating current source, during the half cycles when the anode of 6 is positive, the amplitude of the alternating current output will, at any instant, be proportional to the instantaneous value of the voltage of the alternating current source. The output will be zero during the negative half cycle. Accordingly, the output of the inverter 3 will consist of intermittent alternating current of frequency "$f$", which has, of course, both positive and negative half waves, and which is interrupted during the negative half cycles of frequency "$F$". During the positive half cycles of frequency "$F$", the amplitude of the alternating current output of frequency "$f$" will be proportional to the instantaneous value of the voltage of the source of frequency "$F$". In other words, the intermittent alternating current output of frequency "$f$" will have an envelope corresponding to the wave shape of the source of frequency "F".

Referring now to Fig. 1, let it be supposed that the frequency "F" of the source 1 be, for example, 25 cycles. I may design the inverters 3, 30 to generate alternating current output of a frequency "f" of twenty times, or more, the frequency "F". Let it be supposed that "f" be 500 cycles or more. The inverters 3, 30, I connect to the power source 1 in opposite sense. Thus, the inverter 3 will operate on one-half cycle and the inverter 30 will be inoperative during the time 3 is generating output of frequency "f" and will operate during the half cycle when 3 is inert.

With such an arrangement, either separately excited inverters or self-exciting inverters may be employed. By way of example, I show in Fig. 1 the inverters 3, 30 separately excited from a suitable source of the higher frequency "f", substantially as explained in U. S. Patent No. 1,752,247.

As a source of grid excitation voltage for inverters 3, 30, I show an electron tube oscillator 250 which may be of any suitable type and may consist either of a single electron discharge device, as shown, or may include a plurality thereof such as is employed in types of beat oscillator which are well-known to those skilled in the art. The oscillator may be provided with frequency adjusting means such as a variable reactor 251. The oscillator may be energized from the source 1 through any suitable rectifying anode voltage supply source 252 of the type well-known in connection with radio receivers and like devices.

Beat frequency within the range required for the power control system, variable in frequency by the reactor 251 is supplied to the primary windings of the inverter grid transformer 9, 90. Thus, the inverters will operate at a frequency determined by the adjustment 251. The transformers 9, 90 may preferably have characteristics such as are described in the article by O. Kiltie, printed on page 802 of Electrical Engineering for November, 1932, whereby the wave form of the grid excitation voltage is sharply peaked. It is well-known to those skilled in the art that the use of an excitation voltage wave form of this type is advantageous.

In accordance with the embodiment of my invention, shown in Fig. 1, the power supplied to the load device 2 may be controlled by varying the operating frequency of the inverters 3 and 30 by means of the frequency control element 251. This effect is obtained through a characteristic of vapor electric inverters which is manifested when these are driven from an indepedent source of frequency by seperate excitation of the grids.

Referring to Patent No. 1,752,247 which shows one form of vapor electric inverter, it will be noted that, as explained in the cited patent, the apparatus may oscillate at a frequency dependent on its circuit constants, or may be synchronously driven by separate excitation.

In accordance with the circuit constants of the inverter, the inverter will have a natural frequency at which it will operate when it is arranged to be self-excited. The effect which is made use of in the present invention is associated with the relation between the frequency at which the inverter, when separately excited, is driven, and the natural frequency of the circuit at which the inverter would oscillate if self-excited. When an inverter of this type is self-excited, the wave shape of the output is sinusoidal. When such an inverter is separately excited at a frequency substantially equal to the natural frequency, determined by the circuit constants, the wave form of the output is likewise sinusoidal. When, however, the exciting frequency is less than the natural frequency, the output wave shape is modified in the following way.

On further reference to the explanation furnished in the specification of Patent No. 1,752,247, it will be noted that, during each cycle, when a grid is raised to a positive potential, and anode current is permitted to establish itself, the duration of the resulting half cycle of current which flows is entirely determined by the values of reactance and capacity included in the inverter circuit and, once anode current is initiated, the grid has no further control and until such time as, due to the condenser charging principle involved the anode current has ceased to flow.

For the purpose of explaining this action, let it be assumed that a separately excited inverter has such circut constants that its natural frequency is 60 cycles. Such an inverter, each time one or other of the grids is given a momentary positive excitation, will furnish one-half cycle of anode current, the duration of which, in accordance with the postulated circuit constants, will be 120th of a second. If the inverter is separately excited at a frequency likewise of 60 cycles, each of such half cycles of anode current will be succeeded by like half cycles of positive polarity, since grid excitation impulses will follow one another at intervals coinciding exactly with the duraton of the half cycles of anode current. Therefore, as stated, if the inverter be separately excited at its own natural frequency, an output of sinusoidal wave form will result.

Let it now be assumed that the inverter having a natural frequency of 60 cycles be separately excited at a frequency of 40 cycles. Each time a grid is given an impulse of positive excitation,— the circuit constants being the same, so that the natural frequency is still 60 cycles,—a half cycle of current, having a duration of 1/120th of a second will flow, after which the anode current will be zero. Since the excitation frequency is now 40 instead of 60 cycles, a fresh positive impulse will not coincide with the termination of the anode current. The next grid impulse will not occur until 1/80th of a second has elapsed. It will be apparent, therefore, that between the termination of the first half cycle of current and the initiation of the succeeding one, there will be a period of zero current which will have a duration of 1/240th of a second. The wave shape of the output under these conditions, therefore, will be represented by a series of discontinuous alternating impulses. Each impulse of current will have substantially sinusoidal form, but there will be periods of zero current separating each successive and positive and negative half cycle. Thus, each of the alternating current impulses will have a duration which will be less than that of one-half cycle of the exciting frequency.

From the above explanation, therefore, it will be readily appreciated that, in general, when a separately excited vapor electric inverter of the type described, has a natural frequency greater than that of the exciting frequency, due to the modification of wave form in the manner described, the power output will be substantially less than would be the case if the natural frequency of the inverter coincides with that of the exciting frequency. Thus, with such an arrangement power output will be a function of the ratio between the exciting frequency and the natural frequency. By varying this ratio the power output is controllable.

Having now explained the general principle of inverter operation which my invention makes use of, the manner in which my invention is carried into effect will now be shown.

Referring to Fig. 1 of the drawings of the present application, the frequency of the excitation source 250 is arranged to be adjustable over a suitable frequency range so that the grids of the inverters 3 and 30 may be driven at a frequency up to the natural frequency of the inverters. By adjustment of the frequency control element 251 the excitation frequency may be reduced to any desired extent.

Let it first be assumed that 251 is so adjusted that the excitation frequency is equal to or not greatly in excess of the natural frequency of the inverters. Under these circumstances the operation of the power control system will be substantially the same as would be the case if the inverters were operating self-excited. Accordingly, the currents in the various portions of the circuit will be substantially the same as were represented in Fig. 2, (a) (b) (c) (d) (e) (f) and (g) of the drawing of my co-pending application bearing Serial Number 581,614, filed December 17, 1931, it being assumed that maximum power conditions, with complete rectification by the rectifiers 4 and 40, are referred to.

If it be desired to control the output of the power control system in accordance with my invention, the exciting frequency is adjusted by means of the frequency control element 251. Let it be assumed that the exciting frequency is reduced to approximately two-thirds of the natural frequency of the inverters 3 and 30.

Under these circumstances, the conditions in the various portions of the circuit are represented by the wave form diagrams shown in Fig. 2 of the drawings of the present application. In Fig. 2, (a) (b) and (c) show the input to 3 and 30, respectively. Due to the controlling effect the amplitude of this input current is reduced in proportion to the decreased exciting frequency: In Fig. 2, (d) and (2) show the anode currents flowing in the vapor electric devices 5 and 6 and 50 and 60, respectively; (f) and (g) show the alternating current outputs of the inverters 3 and 30. The effect of the difference between the natural frequency and the exciting frequency will be noted. As described in the foregoing explanation, due to this condition, the successive inverter frequency half cycles are separated by periods of zero current.

The wave forms of the currents in various portions of the rectifiers 4 and 40 are shown in (h) (i) (j) (k) and (l) in which it can be perceived how the output to the load 2, shown in (l), is controlled in magnitude through the action of the inverters 3 and 30 in accordance with the adjustment of the frequency control element 251.

The condensers 17 and 19 and the reactors 18 and 20 represent in Fig. 1 suitable filtering means adapted to eliminate excitation frequency components from the input to and output of the power control circuit and arranged to take care of such range of frequency variation as may be employed.

While there has been shown in Fig. 1 and described with reference to Fig. 2 control of the power output by means of adjustment of the excitation frequency, by way of example, many other means for varying the high frequency output of the inverters 3 and 30, and other suitable forms of inverter, will be apparent to those skilled in the art.

From the above explanation it will be apparent that the basic principle of my invention resides in the control of power by causing a variation in the relation between the natural frequency of the inverters and the frequency at which they are excited.

Thus, it is immaterial whether the natural frequency of the inverters be maintained constant and the excitation frequency varied, or whether the frequency be maintained constant and the natural frequency of the inverters varied to control the power by adjusting the circuit constants of the inverters.

While I have shown in Fig. 1 a convenient method of controlling the power by varying the frequency, I wish it to be clearly understood that control of the power in substantially the same manner may be accomplished by varying the values of the capacities 8, 80, 11, 110, or the reactors 7, 70, or by introducing into the circuits of 3 and 30 other adjustable capacities or reactors.

While the foregoing arrangements have been described as being more particularly suited to furnishing alternating current output, the invention is not restricted to such method of connection. Obviously, if the rectifiers 4, 40 in Fig. 1 be connected in parallel in the opposite manner to that shown, i. e., anode to anode and cathode to cathode, as I have shown in Fig. 4 of the drawings of my co-pending application bearing Serial Number 581,614, filed December 17, 1931, rectified or unidirectional power may be obtained which may be controlled in the manner described without introducing any distortion of wave shape due to the control means. The output wave shape will be determined entirely by the wave shape of the source 1.

It will be apparent to those skilled in the art that the rectifiers 4, 40 may, if desired, when alternating current output is required, instead of actually being connected in parallel, may be arranged to operate to the same effect, with the convenience that the cathode circuits can be, at the same potential by using a transformer having two separate primary windings, one carrying the anode currents of 4, the other the current of 40, and a secondary winding supplying the load 2.

Among the especial advantages which are achieved by the invention is that the power frequency energy, in passing through the control circuit, is subject to only one transformation, this transformation taking place at a higher frequency and the ratio of transformation being suitable to the load requirements. It is well-known to those skilled in the art that the weight, bulk, and cost of transforming and filtering equipment varies inversely as the frequency. Moreover, all condensers and reactors present in the circuit are functional only at the higher frequency and, accordingly are of an order of magnitude, microfarads and henries, respectively, much lower than would be required if the said devices be functional at the power frequency as has been the case in previously proposed systems. In addition, the bulk, weight and cost of these items in the circuit are substantially less than in the case of corresponding equipment operating at the lower frequency.

Another advantage which is achieved by this invention resides in the fact that the regulating effect obtained is substantially independent of the grid control characteristics of the vapor electric devices 3 and 30. It is well-known to those skilled in the art that the operation of inverters of this type, especially in respect of their stability and steadiness of operation, is largely effected by several variable facts, such as gas pressure, temperature, time of deionization and like considerations.

In accordance with the method of control disclosed in this invention, the duration of each half cycle of high frequency power is not determined, as in the case of the system disclosed in my copending application filed December 17, 1931, bearing Serial Number 581,614, by a grid control action of the vapor electric devices 5, 6, 50, 60. The duration of this half cycle of current is entirely determined by the constants represented by the reactances 7, 70 and the various condensers. I have found that this method of control is far less susceptible to variations of temperature, gas pressure and characteristics of the vapor electric devices than systems in which the power is controlled by varying the phase relation of an alternating grid voltage with respect to the anode voltage, or by other equivalent methods of controlling, by means of a grid, the instant in each cycle at which the anode current is permitted to establish itself.

Although I have chosen a particular embodiment of my invention, for purposes of explanation, many modifications thereof will be apparent to those skilled in the art to which it pertains. My invention, therefore, is not to be limited except insofar as is necessitated by the prior art and the spirit of the appended claims.

What I claim as new and desire to secure by Letters Patent of the United States is:

1. The method of controllably deriving power from a primary alternating current source, which comprises converting successive half cycles of power into recurring power impulses at a higher frequency, the frequency of recurrence being maintained coincident with the frequency of said source, controlling the amplitude of the power by varying the said higher frequency, de-modulating said power impulses to derive alternating current power corresponding in phase and in wave shape to the power taken from said primary source, and thereafter combining said de-modulated power impulses in a load circuit.

2. The method of controllably deriving power from a primary alternating current source, which comprises converting successive half cycles of power into recurring power impulses at a higher frequency, the frequency of recurrence being maintained coincident with the frequency of said source, controlling the amplitude of the power by varying a relation between said process of conversion and said higher frequency, de-modulating said power impulses to derive alternating current power corresponding in phase and in wave shape to the power taken from said primary source, and thereafter combining said de-modulated power impulses in a load circuit.

3. An alternating current electric power control system, including a source of power of given frequency and wave shape, a plurality of converting means, energized respectively by opposite half cycles of the said power source, to generate power of a frequency higher than that of the said source, the envelope of the high frequency power output of said converting means being in accordance with the wave shape of the half cycles of the power source energizing said converting means, means for varying said higher frequency, means whereby said frequency variation produces a controlling effect on the output of said converting means, and a plurality of uni-laterally conducting devices energized by said higher frequency power, said devices being connected respectively to rectify the higher frequency power generated by half cycles of the source frequency, said rectifying and controlling means including high frequency filtering means to eliminate the high frequency component from the rectified output, and being so connected that the rectified output corresponding to opposite half cycles of the power source is delivered in opposite sense to the output circuit, to furnish said output circuit with alternating current energy corresponding in frequency phase and wave form to the said source of power and controlled to magnitude in accordance with the said controlling effect.

4. An alternating current electric power control system, including a source of power of given frequency and wave shape, a plurality of inverting means energized respectively by opposite half cycles of the said power source, to generate power of a frequency higher than the frequency of said source, the envelope of the high frequency power output amplitude of said inverting means being in accordance with the wave shape of the respective half cycles of the power source energizing said inverting means, variable frequency means for controlling the higher frequency output of said inverting means and a plurality of uni-laterally conducting devices, energized by said high frequency power, said devices being connected respectively to rectify said controlled high frequency power generated by opposite half cycles of the source frequency, said rectifying and controlling means including high frequency filtering means to eliminate the high frequency component from the rectified output, and being connected so that the rectified output corresponding to opposite half cycles of the power source is delivered in opposite sense to the output circuit, to furnish said output circuit with alternating current energy corresponding in frequency, phase and wave shape with the said source of power and controlled in magnitude in said manner.

5. An alternating current electric power control system, including a source of power of given frequency and wave shape, controlling and inverting means energized by alternate half cycles of the said source to generate, intermittently, power of a variable frequency higher than that of said source, full wave rectifying means energized by said intermittent high frequency power, to furnish half cycles of source frequency corresponding in phase and wave shape with the alternate half cycles energizing said inverting and rectifying means, and variable in magnitude in accordance with said controlling effect, together with further like variable frequency controlling, inverting and rectifying means energized by opposite alternate half cycles of the source of power, to generate, intermittently, during half cycles when the first-mentioned inverting means is inoperative, power of a frequency higher than that of said source, and likewise furnishing source frequency half cycles corresponding in phase and wave shape with the opposite alternate half cycles of the source of power energizing said inverting and rectifying means, and variable in magnitude in accordance with said controlling effect, said means being connected in opposite sense so that the alternate source frequency half cycles, controlled in said manner are combined to deliver an alternating current output.

6. An alternating current electric power control system, including a source of power of given frequency and wave shape, controlling and inverting means energized by alternate half cycles of the said source to generate, intermittently, power of a variable frequency higher than that of said source, full wave rectifying means energized by said intermittent high frequency power, to furnish half cycles of source frequency corresponding in phase and wave shape with the alternate half cycles energizing said inverting and rectifying means, and variable in magnitude in accordance with said controlling effect, together with further like variable frequency, controlling, inverting and rectifying means energized by opposite alternate half cycles of the source of power, to generate, intermittently, during half cycles when the first-mentioned inverting means is inoperative, power of a frequency higher than that of said source, and likewise furnishing source frequency half cycles corresponding in phase and wave shape with the opposite alternate half cycles of the source of power energizing said inverting, rectifying and controlling means, and variable in magnitude in accordance with said controlling effect, said means being connected in like sense so that alternate source frequency half cycles, controlled in said manner, are combined to deliver a rectified current output.

7. In combination, a source of power at a given frequency F, an inverter having a natural frequency $f_1$ connected to said source to receive energy therefrom the natural frequency $f_1$ of the inverter being higher than the frequency F of the source, an alternating potential source of frequency $f_2$ for exciting the inverter, an output circuit for said inverter, rectifying means effectively included in said output circuit, and means for varying the ratio $$\frac{f_1}{f_2},$$

whereby the power output from said rectifying means may be controlled.

8. The invention set forth in claim 7 characterized in that the inverter includes at least one grid-controllable space-current device of the vapor-electric type.

9. The invention set forth in claim 7 characterized in that the rectifying means includes a plurality of space current devices differentially coupled to the output circuit of the inverter.

10. The invention set forth in claim 7 characterized in that the power output is controlled by varying $f_1$ and maintaining $f_2$ substantially constant.

11. The invention set forth in claim 7 characterized in that the power output is controlled by varying $f_2$ and maintaining $f_1$ substantially constant.

12. In combination, a source of power at a given frequency F, a plurality of inverters each having a natural frequency $f_1$ differentially connected to said source so as to be alternately energized thereby, each inverter being provided with an output circuit effectively including rectifying means, an alternating potential source of frequency $f_2$ for exciting the inverters, a common output circuit for said rectifying means for delivering power at frequency F, and means for varying the ratio $$\frac{f_1}{f_2}$$

whereby the power output from said rectifying means may be controlled.

13. In an alternating current electric power control system, inverting means for generating alternating current, connections for energizing said inverting means from a source of alternating current power, the operating frequency of said inverting means being substantially higher than that of said source, means for rectifying the output from said inverting means, and variable-frequency means for controlling the output of said inverting means.

14. The invention set forth in claim 13 characterized in that the variable-frequency means is constituted by an alternating potential source for exciting the inverting means and additionally characterized in that the said source is capable of furnishing exciting potential over a range of frequencies lower than the natural frequency of said inverting means.

15. The invention set forth in claim 13 characterized in that a source of alternating potential is provided for exciting the inverting means and further characterized in that the variable-frequency means is constituted by means for adjusting the natural frequency of the inverting means over a range of frequency higher than that of said source of alternating potential.

16. The method of controllably deriving power from a source which comprises converting power from said source into a series of current increments, each of said increments being of predetermined duration and having an amplitude proportional to the voltage of said source, applying said increments successively to a load circuit, and controlling the frequency at which said increments are delivered to said load circuit.

17. In an electric power control system, a source of power, an inverter including at least one electric valve of the vapor-electric type, the anode circuit of said valve being energized from said source of power, said inverter having a natural frequency of $f_1$, a grid transformer, a source of alternating potential at a frequency $f_2$, the control electrode of said valve being energized, through said grid transformer, from said alternating source so as to cause said inverter to operate in synchronism with said source, a load circuit energized by the output of said inverter, and means for controlling the amount of power delivered to said load circuit by varying the ratio $$\frac{f_1}{f_2}.$$

18. In combination, at least one inverter of the vapor-electric type having a natural frequency $f_1$, a source of excitation frequency $f_2$, said inverter being excited from said source and delivering output power at a frequency determined thereby, a source of power of a kind different to that of said output, said inverter being energized from said last mentioned source, rectifying means energized by the output of said inverter, and means for controlling the amount of power received by said rectifying means from said inverter, by varying the ratio $$\frac{f_1}{f_2}$$

ALAN S. FITZ GERALD.